(12) United States Patent
Murdock (10) Patent No.: US 7,234,479 B2
(45) Date of Patent: Jun. 26, 2007

(54) SANITARY YARD HYDRANT

(75) Inventor: Robert A. Murdock, Cincinnati, OH (US)

(73) Assignee: Murdock, Inc., Cincinnati, OH (US)

( * ) Notice: Subject to any disclaimer, the term of this patent is extended or adjusted under 35 U.S.C. 154(b) by 278 days.

(21) Appl. No.: 11/051,949

(22) Filed: Feb. 4, 2005

(65) Prior Publication Data

US 2005/0173001 A1 Aug. 11, 2005

Related U.S. Application Data

(60) Provisional application No. 60/542,766, filed on Feb. 6, 2004.

(51) Int. Cl.
*F16K 21/00* (2006.01)
(52) U.S. Cl. .................... 137/1; 137/301; 137/287; 137/281
(58) Field of Classification Search ................. 137/301, 137/286, 287, 281, 1
See application file for complete search history.

(56) References Cited

U.S. PATENT DOCUMENTS

| | | | |
|---|---|---|---|
| 184,128 A * | 11/1876 | Ahrens .................. 137/281 |
| 1,937,667 A * | 12/1933 | Parsley et al. ............. 137/281 |
| 2,630,130 A | 3/1953 | Murdock et al. |
| 2,664,096 A | 12/1953 | Murdock et al. |
| 6,047,723 A | 4/2000 | Hoeptner, III |
| 6,427,716 B1 | 8/2002 | Hoeptner, III |
| 6,899,120 B1 * | 5/2005 | Motley ...................... 137/301 |

* cited by examiner

*Primary Examiner*—Kevin Lee
(74) *Attorney, Agent, or Firm*—Wood Herron & Evans, LLP (57) ABSTRACT

A water hydrant for suppling potable water from a water source has an internal movable riser contained within a housing that extends beneath the ground to a depth below which freezing temperatures cannot reach. A chamber housing located at a distal end of the hydrant, beneath the frost line, contains a valve which may be actuated by the moving riser to provide a flow of water from the water source and through the riser. The chamber housing is configured to receive residual water from the riser when the flow of water has been shut off by the valve and to store the water beneath the frost line under sanitary conditions. A piston is disposed on a distal end of the riser, is slidably disposed within the chamber housing, and moves with the riser to expel water from the chamber housing when a handle of the hydrant is subsequently moved to reopen the valve.

26 Claims, 8 Drawing Sheets

SANITARY YARD HYDRANT

CROSS-REFERENCE TO RELATED APPLICATION

This application claims priority to U.S. Provisional Application Ser. No. 60/542,766 filed on Feb. 6, 2004, incorporated herein by reference in its entirety.

FIELD OF THE INVENTION

This present invention relates to water hydrants and, more particularly, to a sanitary water hydrant for supplying potable water from a water supply.

BACKGROUND OF THE INVENTION

Outdoor water hydrants are useful for supplying potable water in various locations, such as parks, farms, railroad yards and various other outdoor settings. Because the water dispensed from such hydrants may be consumed by humans or animals, the water must be provided from the water source under sanitary conditions. Thus, care must be taken that the hydrant is sealed from the surrounding environment against leaks into the hydrant or water supply. If these outdoor hydrants are used with hoses, they are often fitted with vacuum breakers to prevent back flow of water from the environment through the hydrant which could contaminate the water supply. Furthermore, because these outdoor hydrants may be exposed to freezing temperatures, there is a potential for water in the hydrant to become frozen, where it may clog or damage the hydrant. To overcome this problem, valves used in outdoor hydrants are commonly buried in the ground below the level to which freezing temperatures may penetrate (i.e. below the frost line). Accordingly, the valve must be opened from above the ground, whereby water is provided to the surface through a riser pipe and an outlet of the hydrant.

Conventional outdoor hydrants have several drawbacks. For example, the external riser which connects the valve buried beneath the frost line to the outlet above the surface of the ground may be exposed to freezing temperatures, whereby water in the riser can freeze to either clog or damage the hydrant. To overcome this problem, water remaining in the riser after the valve is closed is often drained from the riser. This solution creates further problems, however. If the residual water from the riser is drained into the soil around the hydrant, a potential is created for "brown water" to enter the hydrant through drain holes, whereby fresh water may become contaminated on next use of the hydrant. If, instead, the residual water is drained to a reservoir below the frost line, this residual water is generally mixed with fresh water from the supply when the value is reopened. Because the fresh water is mixed with the old water as it is dispensed from the hydrant, it may take a long time, as much as a minute or more, to completely expel the old water from the hydrant.

Conventional systems which drain residual water to a reservoir typically utilize a venturi system to draw the water from the reservoir when the valve is reopened, whereby the flow of water from the water supply is used to entrain the stored, residual water and dispense it from the outlet. These venturi systems generally require a high velocity, low pressure flow for proper operation. This high velocity, low pressure flow is often in conflict with the requirements of the vacuum breaker system, which requires a minimum pressure threshold to function properly and which may restrict flow to a point where the venturi is ineffective. Still another drawback of conventional outdoor hydrants is that excavation is required to access and service wear parts of the hydrant which are located beneath the surface. The exposed riser is also susceptible to damage from above the surface, or when excavation is performed near the hydrant.

There is thus a need for an improved water hydrant which can be used to supply potable water under sanitary conditions while overcoming drawbacks of conventional water hydrants, such as those described above.

SUMMARY OF THE INVENTION

The present invention provides a water hydrant which provides potable water in outdoor environments and which overcomes drawbacks of prior water hydrants. In an exemplary embodiment, the water hydrant of the present invention includes an internal riser which itself is reciprocated to operate a water valve located beneath the frost line. The riser is enclosed within a housing that extends beneath the ground to a point below the frost line. The riser is coupled to a handle of the hydrant and is moved by the handle to actuate a water valve located at a distal end of the hydrant, below the frost line. A spigot on the hydrant is attached to the riser and moves with the riser when the riser is actuated by the handle.

In another aspect of the invention, the hydrant further includes a chamber housing, located at a distal end of the housing beneath the frost line. The chamber housing defines a chamber into which residual water remaining in the riser after flow of water has been shut off may be drawn to empty the riser and thereby prevent freezing of water in the riser.

Advantageously, the chamber housing is sealed off from the surrounding environment, whereby water may only enter and exit the chamber housing through the valve and riser. The hydrant thus ensures that sanitary conditions of the water supply and water stored in the chamber housing are properly maintained.

In yet another aspect of the invention, the exemplary hydrant includes a piston located at a distal end of the riser and slidably disposed within the chamber housing. The piston moves with the riser and expels residual water which has been stored in the chamber housing prior to actuation of the valve with the riser to open the valve. The residual water is quickly expelled from the spigot at the initiation of flow from the water supply.

In yet another aspect of the present invention, the exemplary hydrant includes an opening in the upper end of the housing which may be covered by a removable cap. The opening permits servicing of hydrant components from above grade, without the need to excavate around the hydrant.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
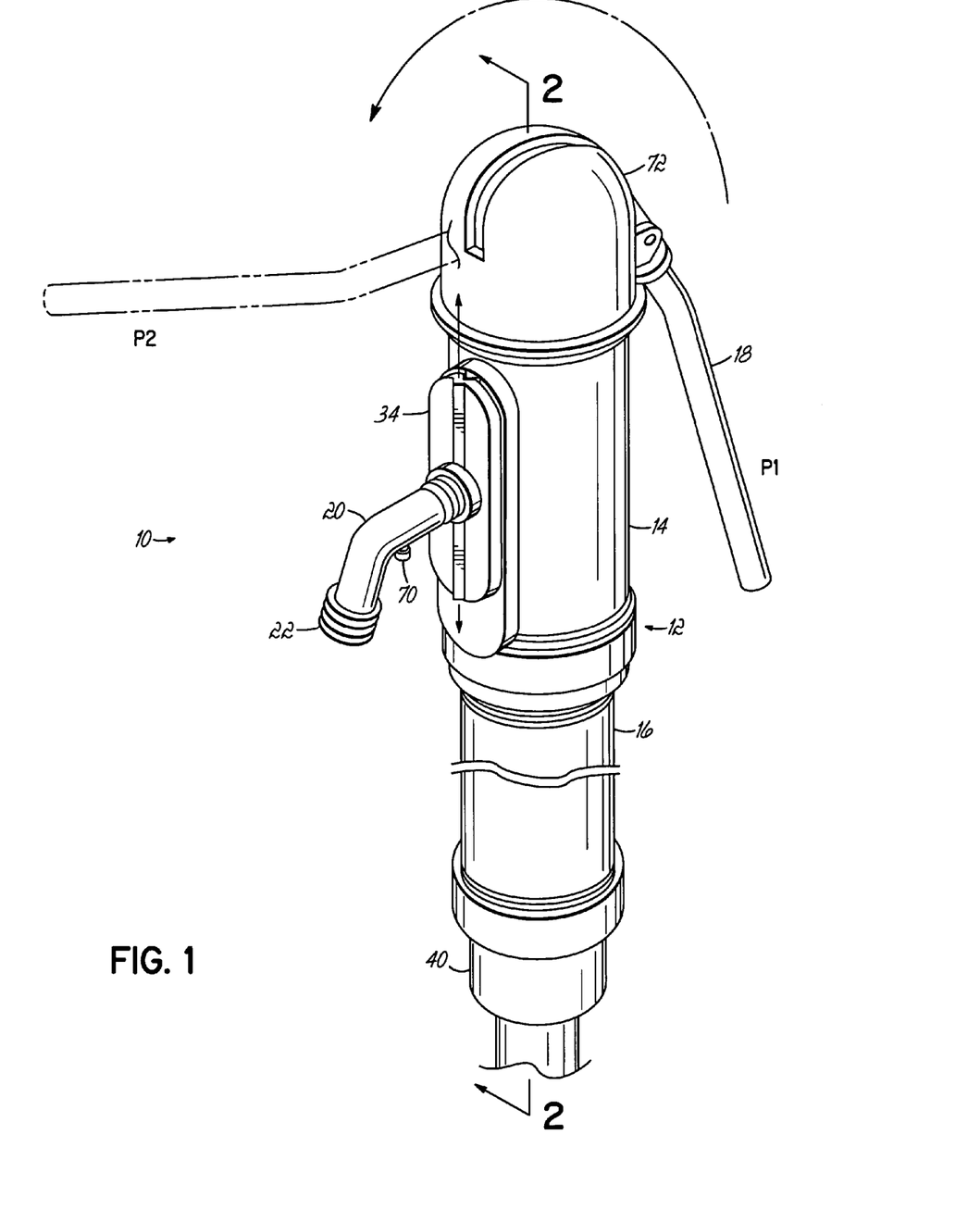
FIG. 1 is a perspective view of an exemplary hydrant of the present invention.
Figure 1A:
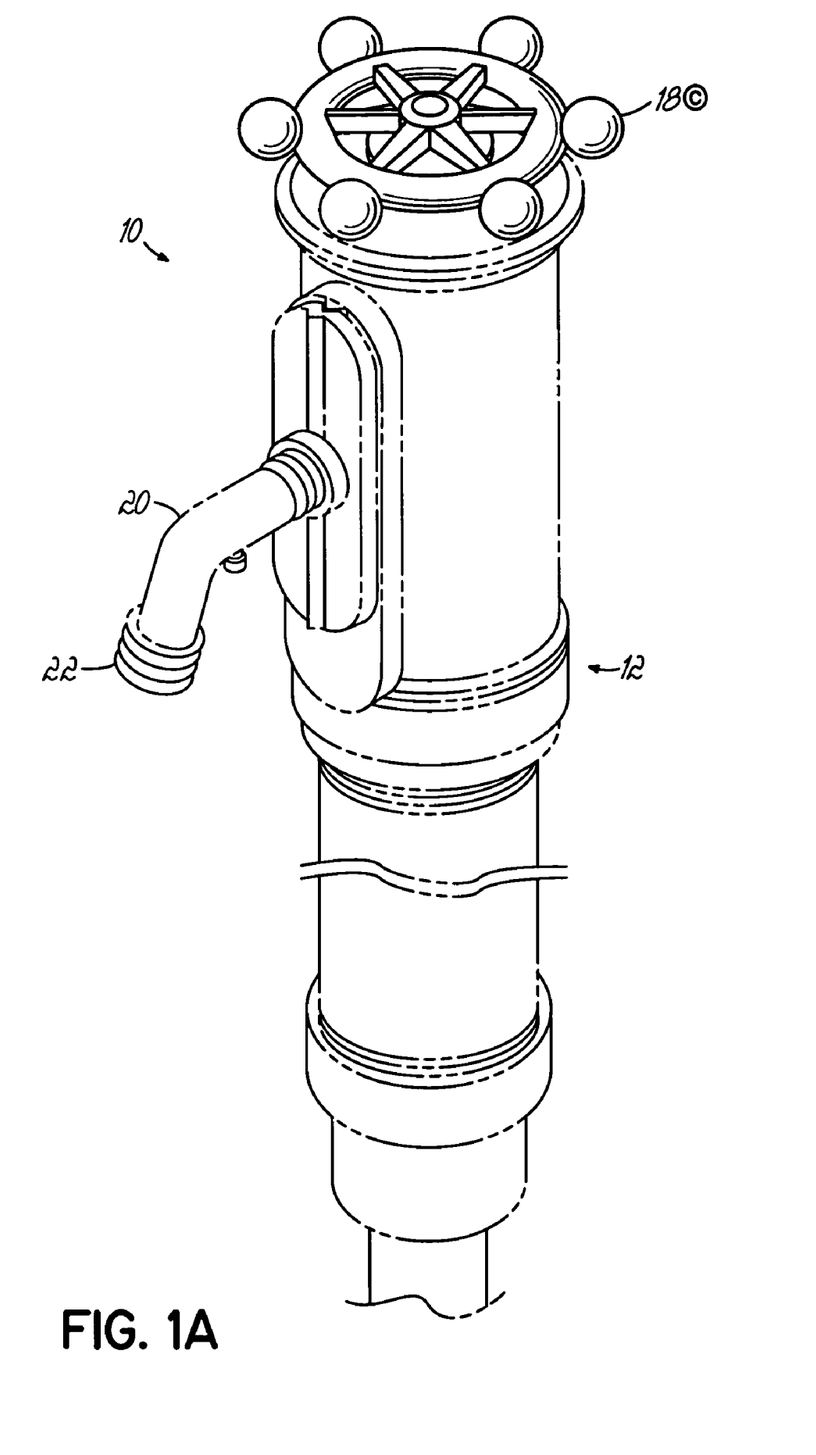
FIG. 1A is a perspective view of a second exemplary hydrant, having a rotatable handle for operating the hydrant.

Referring to FIG. 1, there is shown an exemplary water hydrant 10 of the present invention. The hydrant 10 includes a housing 12 which has an upper casing 14 that is generally exposed above the ground, and an elongate pipe 16 which extends from the upper casing 12 beneath the ground. The hydrant 10 further includes a handle 18 for operating the hydrant 10 and a spigot 20, having an outlet 22, for dispensing water from a water supply. In an exemplary embodiment, the handle 18 of the hydrant 10 is a lever type handle, but may be of other types such as a rotary knob 18', as depicted in FIG. 1A, or any other suitable device for manipulating the hydrant elements described herein.

Figure 2:
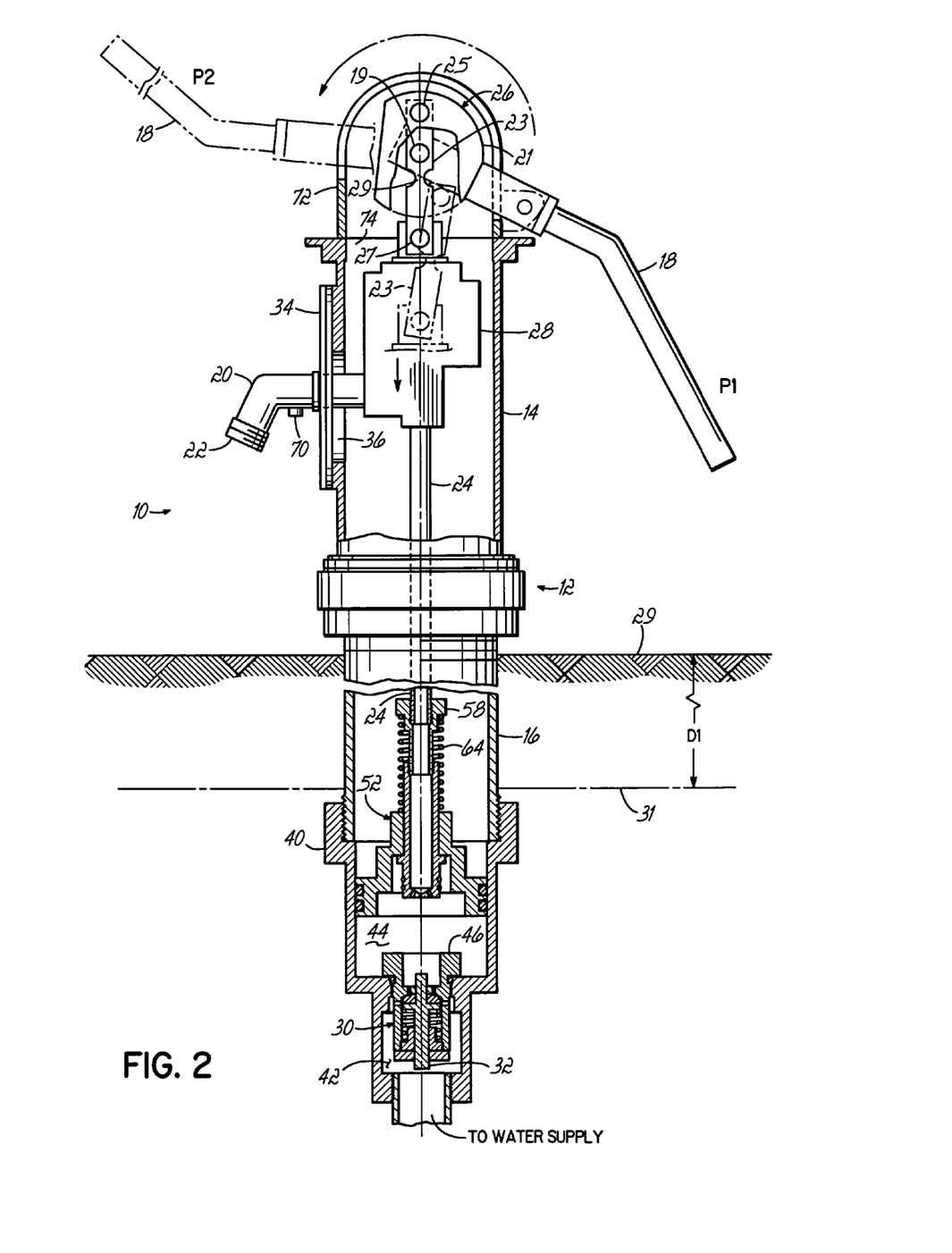
FIG. 2 is a cross-sectional view of the hydrant of FIG. 1 taken along line 2-2 of FIG. 1.

Referring further to FIG. 2, the handle 18 is pivotally mounted to a shaft 19 and is coupled to a riser 24 contained within the housing 12. The riser 24 extends from the upper casing 14 through the pipe 16 and is movable to engage a valve assembly 30 located beneath the surface and coupled to the water supply. In the exemplary embodiment shown, handle 18 is coupled to riser 24 by a linkage assembly 26 and a manifold 28. The linkage assembly 26 includes a disk-shaped cam 21 fixed to the end of handle 18 for pivotal movement about shaft 19. A link member 23 has a first end 25 pinned to the cam 21 and a second end 27 pinned to the manifold 28. Movement of the handle 18 about shaft 19 rotates cam 21 to move link member 23 and thereby cause the manifold 28 and riser 24 to reciprocate within the housing 12 such that a valve 32 of valve assembly 30 may be selectively opened or closed, as will be described more fully below.

When valve 32 is opened by movement of the handle 18, water from the water supply may flow through the valve 32 and riser 24 and out of the spigot 20. The spigot 20 is coupled to the riser 24 through manifold 28 and moves with the riser 24 on a slidable plate 34, which is joined to the spigot 20 and slidably retained on an outer portion of the casing 14. In an exemplary embodiment, the spigot 20 extends through a slot 36 in the casing 14 and moves in the slot, with the riser 24. In another embodiment, the valve assembly 30 is located at least to a depth D1 beneath the surface 29 which is deeper than the depth to which freezing temperatures may reach, in other words, below the frost line 31.

In yet another embodiment, hydrant 10 is configured to provide a mechanical safety to the internal components of the hydrant 10 so that damage to the internal components can be avoided in the event that excessive force is applied to handle 18. In the embodiment shown in FIG. 2, link member 23 of linkage assembly 26 has reduced dimensions in a target area 29, whereby target area 29 will deform or break under application of excessive force to handle 18. While this embodiment depicts a link member 23 with reduced dimensions to protect the internal components, it will be recognized that various other mechanical safeties may be employed to protect the internal components of the hydrant 10.

Referring further to FIGS. 3A through 3E, the hydrant 10 further includes a chamber housing 40 connected at a distal end of the pipe 16. The chamber housing 40 has two interior chambers 42, 44. The valve assembly 30 is disposed in the first chamber 42 of the chamber housing 40. A valve body 46 has at least one inlet passage 47 and at least one flow passage 48 in valved fluid communication with a water supply pipe. When the valve is opened, water from the supply may flow through the passages 47, 48 and into the riser 24 to the outlet 22 of the spigot 20. The valve body 46 may be threadably attached to chamber housing 40 and may include O-rings 49 to seal the valve body 46 against the chamber housing 40. The valve assembly 30 further includes a moveable valve member 32 movably positioned in the valve body 46, and operable with seal 33 against seat 35 to seal off passage 48 to prevent flow of water from the supply through the valve body passages 47, 48. In an exemplary embodiment, the valve member 32 comprises a poppet valve having a valve seal 33 which is biased by a spring 50 in a direction which seals the flow passage 48. The valve 32 is also biased in a direction to close the flow passage 48 by the water pressure in the water supply.

The second chamber 44 of the chamber housing 40 houses a piston 52 which is slidably disposed within the chamber 44 of the chamber housing 40. The piston 52 includes O-rings 54 disposed on an outer circumference of the piston 52 to seal against the interior walls of the chamber housing 40. The piston 52 is reciprocally mounted at a lower end of the riser 24 whereby motion of the riser 24 moves the piston 52 from a first position (FIG. 3A) defining a volume V1, in the chamber 44 of the chamber housing 40 beneath the piston 52, toward a second, extended position (FIG. 3C) adjacent the valve assembly 30, where the piston 52 seats against floor 45 of the chamber housing 40 (see FIG. 3B). In this position, all water residing in chamber 44 is expelled upwardly through riser 24. In an exemplary embodiment, the piston 52 is attached to a fitting 58 or plunger connector on the riser 24 by means of a plunger 56 coupled to the distal end of the fitting 58. The plunger 56 includes fluid passages 60 and a central passage 62 in fluid communication with the riser 24 to permit the flow of water therethrough.

The piston 52 is slidably connected to the plunger 56 such that the plunger 56 may continue to move toward the valve assembly 30 once the piston 52 has sealed against the floor 45 of the chamber housing 40. Once the piston 52 has sealed against the chamber housing 40 (FIG. 3B), the riser 24 and plunger 56 then continue to move toward the valve assembly 30, where the forward end 57 of plunger 56 engages the valve stem 37 such that the valve 32 is moved to an open condition (FIG. 3C). Water flows from the water supply, through the passages 47, 48 through the plunger 56, and riser 24, to exit the outlet 22 of the spigot 20. A spring 64 disposed at a distal end of the riser 24, and plunger connector 58 biases the piston 52 in a direction toward the valve assembly 30, allowing plunger 56 to continue its forward motion against valve stem 37 even when piston 52 is bottomed out. In an exemplary embodiment, the plunger 56 includes O-rings 66 to sealingly engage an interior bore 51 of the valve body 46 prior to opening of the valve 32 (FIG. 3C).

Because the valve assembly 30 is separate from the riser 24 and plunger 56, the valve assembly 30 can be optimized to provide a desired valving performance irrespective of the length or movement of the riser 24. The valve assembly 30 may also be manufactured to conventional tolerances regardless of the length of the riser 24, and may even be a commercially available component. The separate valve assembly 30 and riser 24 also permits more efficient dispensing of substantially all of the water from the chamber 44 at the onset of flow after handle 18 has been moved to cause water to flow from the hydrant 10.

Figure 3A:
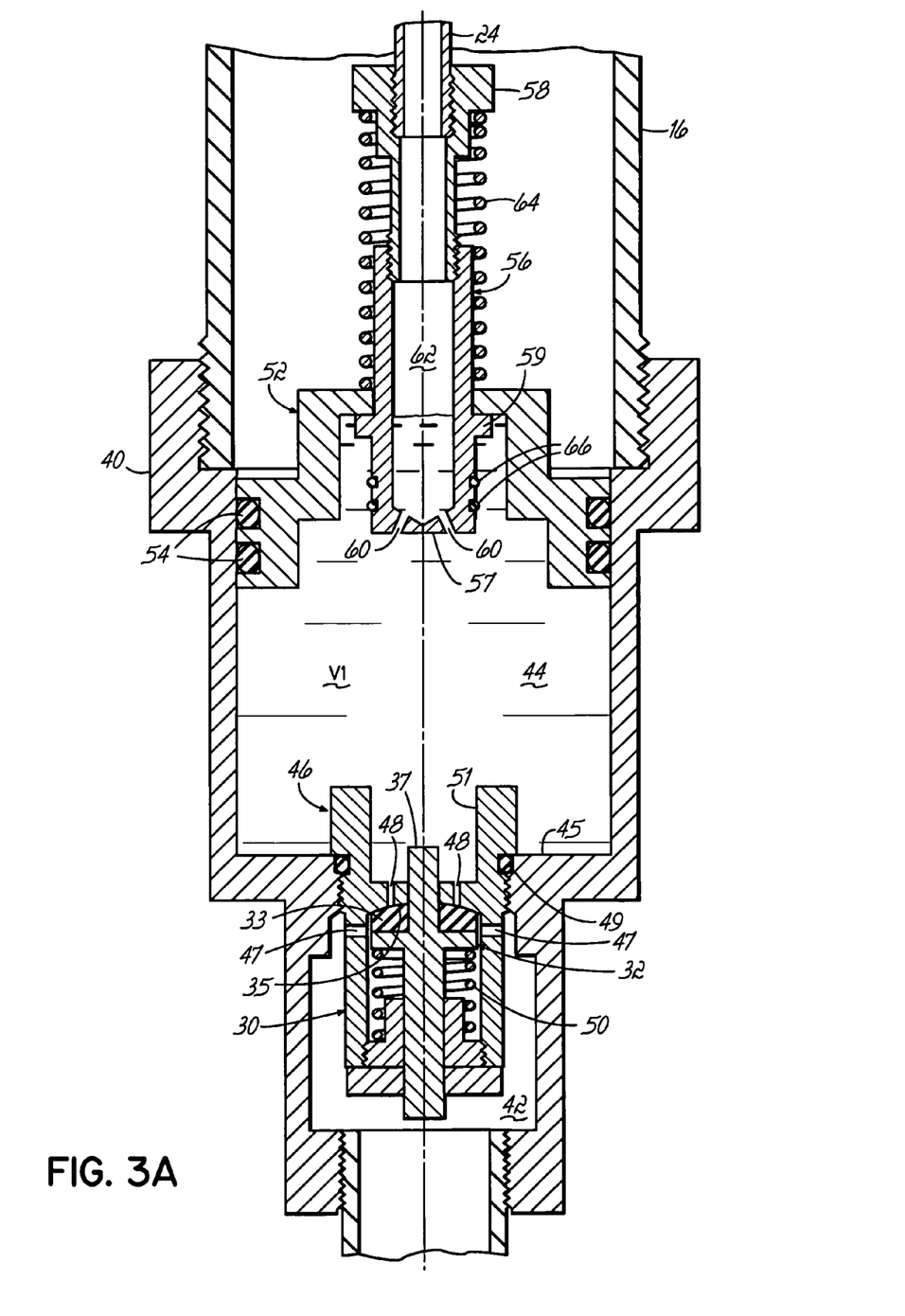
FIGS. 3A-3E show detail views of the lower valve and chamber of the invention of FIG. 2 and depict operation of the hydrant.
Figure 3B:
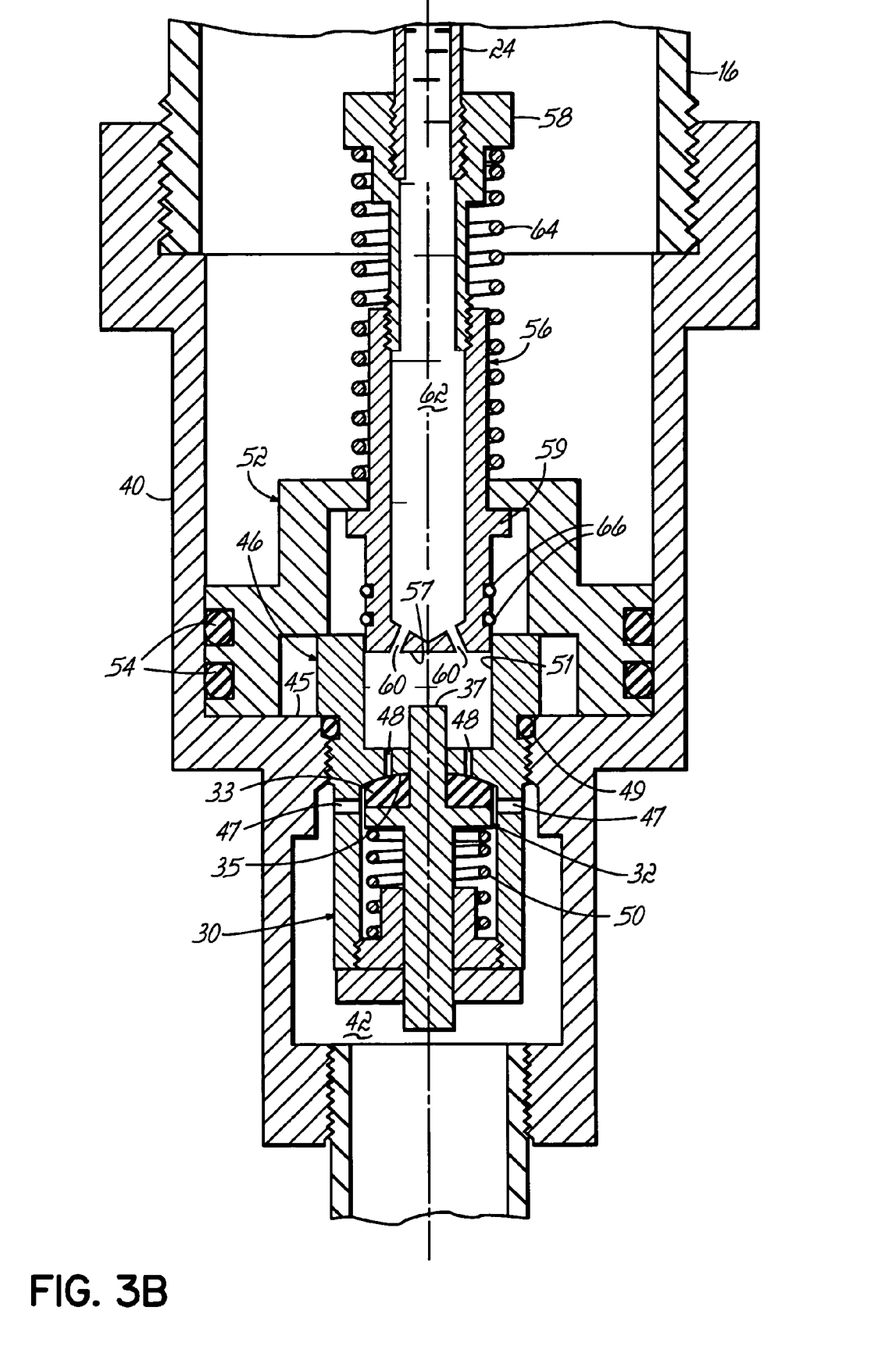
Figure 3C:
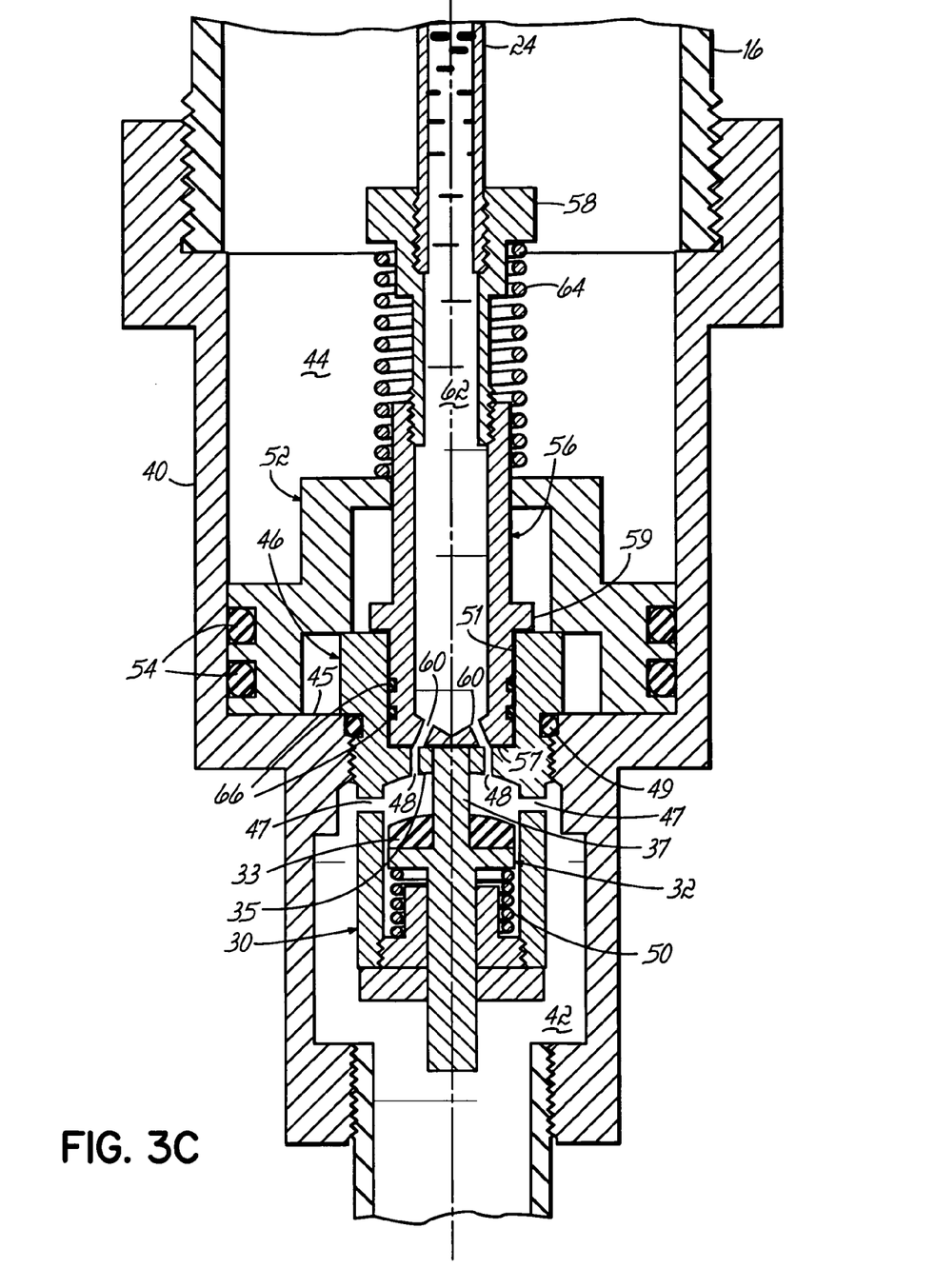

Referring to FIGS. 2 and 3A through 3E, the operation of the hydrant 10 will now be explained. For clarity, water behind closed valve 32 (from the water supply) has been omitted in FIGS. 3A, 3B, 3D and 3E. When the handle 18 of the hydrant 10 is at a no-flow position P1, the piston 52 is disposed at a first position at an upper end of the chamber housing 40 and away from the valve assembly 30 as seen in FIG. 3A. A volume V1 of residual water, which has been previously drained from the riser 24, is stored in the chamber 44 of the chamber housing 40, between the valve assembly 30 and the piston 52. The residual water in chamber 44 is sealingly stored from the environment and is located beneath the frost line (FIG. 2). As the handle 18 is moved from the no-flow position P1 toward a flow position P2, the piston 52 is urged toward the valve assembly 30 under the influence of the riser 24 and spring 64. As the piston 52 moves towards the valve assembly 30, the volume V1 of residual water stored in the second portion 44 of the chamber housing 40 is forced through the flow passages 60 in the plunger 56 and up through the riser 24.

When the piston 52 has seated against the floor 45 of the chamber housing 40 (FIG. 3B), substantially all of the residual water has been forced from the chamber 44 into the riser 24. At this point, the valve 32 remains biased in a closed condition and the plunger 56 is just beginning to enter the bore 51 of valve body 46. As the handle 18 continues to move toward the flow position P2, the riser 24 and plunger 56 continue to move in a direction toward the valve 32 and the plunger 56 sealingly engages in bore 51.

As the riser 24 and plunger 56 move further, the end 57 of plunger 56 engages the valve stem 37 and urges the valve 32 in a direction away from the passages 47, 48, against the action of the valve spring 50 and water supply pressure, to permit water to flow from the water supply, through the passages 47, 48, through the plunger passages 60, and into the riser 24 (FIG. 3C). Water continues to flow up the riser 24 and out of the outlet 22 of the spigot 20. Advantageously, the entire volume V1 of residual water is forced out of the outlet 22 of the spigot 20 at the onset of flow and preferably in less than 0.5 second. Thereafter, only fresh water is supplied from the water supply through the hydrant outlet 22.

Figure 3D:
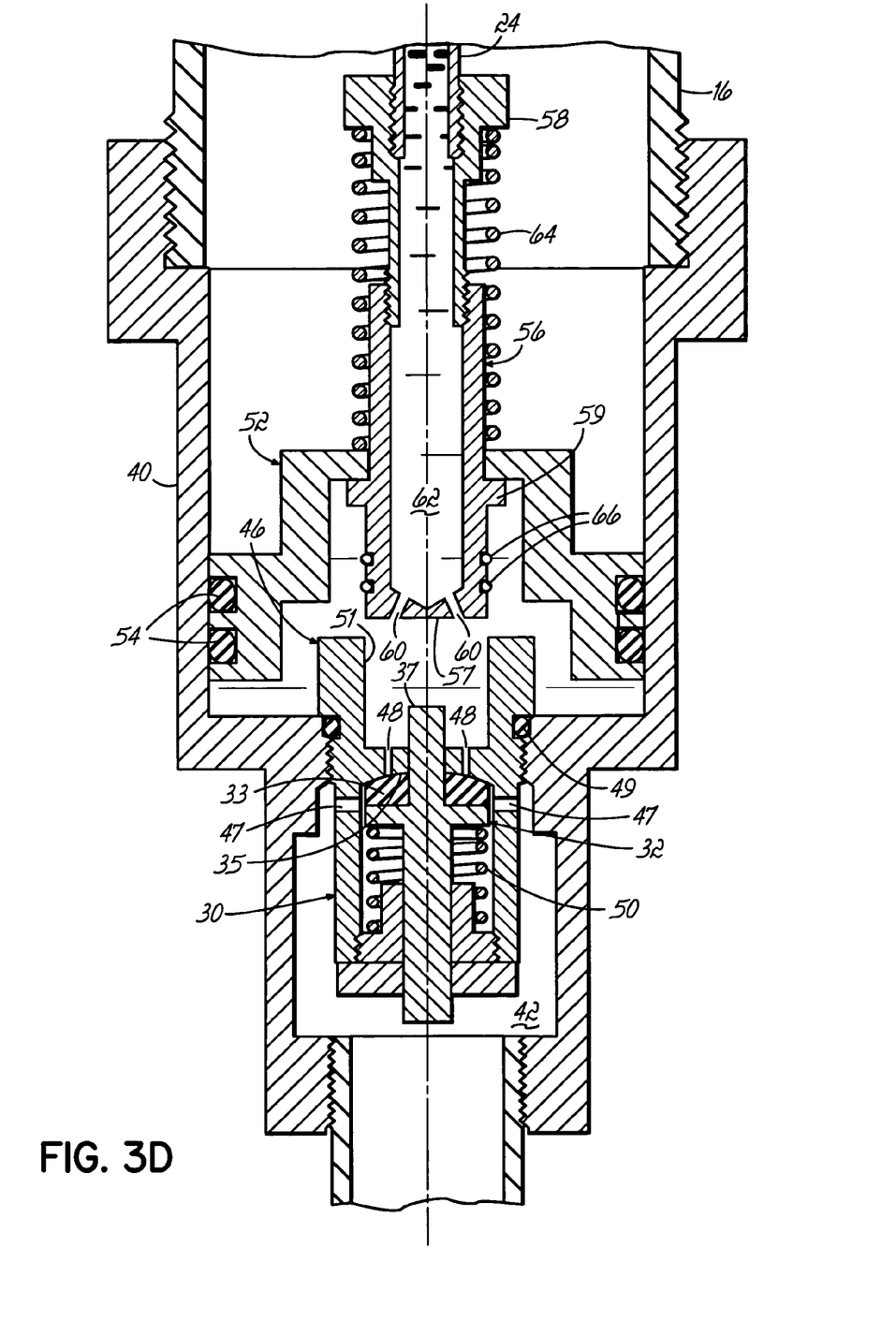
Figure 3E:
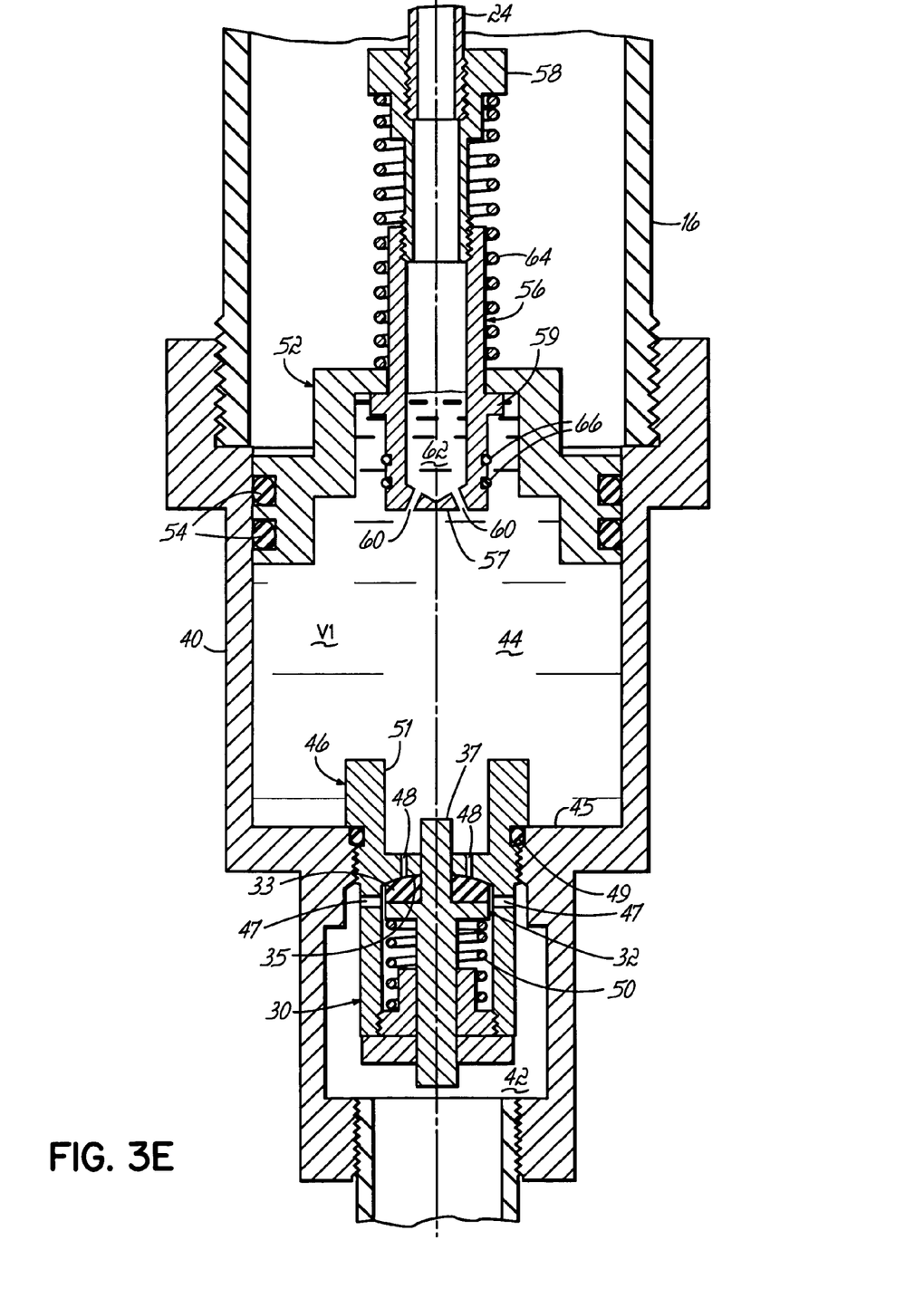

After a desired amount of water has been dispensed from the hydrant 10, the handle 18 may be moved from a flow position P2 to a no-flow position P1 to close the valve 32 and stop the flow of water. Referring to FIG. 3D, as the handle 18 moves toward the no-flow position P1 from the flow position P2, the riser 24, plunger 56 and piston 52 are drawn away from the valve assembly 30. The plunger 56 first disengages the valve stem 37 allowing the valve 32 to move into a closed condition under the influence of the spring 50 and pressure of the supply. Flow from the water supply is stopped. The plunger 56 is withdrawn from sealing engagement with the bore 51 and plunger flange 59 engages the piston 52 to pull the piston 52 away from the valve assembly 30. As the piston 52 moves from the second position seated against the floor 45 toward the first position, the increasing volume developed beneath the piston 52 in chamber 44 creates a positive suction which draws residual water remaining in the riser 24 above the frost line, down through the passages 60 of the plunger 56 and into the volume V1 beneath the piston 52 (FIG. 3E).

An air bypass valve 70 may be located on the spigot 20 to permit the residual water to drain from the riser 24 without drawing water into the hydrant 10 from the outside environment. In one embodiment, the air bypass valve 70 is a vacuum breaker type valve, as known in the art. In another embodiment, the air bypass valve is a spring-biased check valve that is configured to be closed to atmosphere during normal operation of the hydrant 10 to deliver water through spigot 20, and opens to atmosphere to permit residual water to drain from the riser 24 when handle 18 is moved toward the no-flow position P1 to stop the flow of water from the hydrant 10. The chamber housing 40 is configured such that the volume V1, created beneath the piston 52 when the piston 52 is moved to the first position, corresponds to the volume of water remaining in the riser 24 after flow of water has been shut off. Advantageously, the residual water may be stored in the chamber housing 40, sealed off from the environment and below the frost line, until the handle 18 of the hydrant 10 is once again moved toward the flow position P2 to dispense water from the water supply, as described above.

Referring to FIGS. 1 and 2, the upper casing 14 comprises a cap 72 which is removably attached to the casing 14 to cover an opening 74 in an upper portion of the casing 14. When the cap 72 is removed, the opening 74 provides access to the interior components of the hydrant 10 for servicing, as may be required. Advantageously, the opening 74 permits the replacement of wear items, such as O-rings 49, 54, 66 or valve seat 33, or to permit servicing of other components from above grade without the need to excavate. The valve body 46 can be unscrewed by insertion of a long wrench inserted through opening 74 and the entire valve 30 as well as piston 52 can be removed, maintained, and replaced.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A sanitary water hydrant, comprising:
 a hydrant housing having an upper end and a distal end;
 a water valve proximate said distal end of said housing, said valve being selectively openable to pass water and closeable to stop water flow;
 an elongate water riser disposed for movement within said housing and having a distal end oriented proximate said water valve;
 a water outlet operably coupled with said water riser;
 an actuating member coupled to said riser to raise and lower said riser;
 a valve engaging member coupled to said riser for movement therewith, said valve engaging member selectively engagable with said water valve for selective opening of said valve when said actuating member is moved to lower said riser to pass water through said valve and said riser to said outlet;
 a water receiving chamber proximate said distal end of said housing for receiving water from said riser when said valve is closed; and
 a piston in said chamber, said piston slidably coupled to said riser for independent movement with respect thereto, said piston movable with said riser such that said piston draws water into said receiving chamber when said valve is closed.

2. The sanitary water hydrant of claim 1 wherein said chamber is sealed to prevent water passage therefrom, externally of said housing, other than through said riser upon further movement of said riser.

3. The sanitary water hydrant of claim 1 wherein said piston is moveable with said riser in a direction toward said valve and expels water from said chamber into said riser when said riser is moved to open said valve.

4. The sanitary water hydrant of claim 3 wherein water in said chamber is expelled into said riser prior to water flowing through said valve into said riser.

5. The sanitary water hydrant of claim 1 wherein said hydrant is adapted for year-round outdoor use and wherein the ground in which said hydrant is installed may be frozen down to a frost line, said housing sufficiently elongated to position said chamber beneath the frost line when said hydrant is installed outdoors.

6. The sanitary water hydrant of claim 5 wherein said housing has an opening and said riser and said valve are serviceable from above said hydrant through said opening.

7. The sanitary water hydrant of claim 3 wherein said piston is spring biased on said riser in a direction toward said valve, said piston movable with said riser to a stationary, extended position after expelling water from said chamber, and wherein said riser is operable to move toward said valve to open said valve after said piston is stopped in said extended position.

8. The sanitary water hydrant of claim 1 wherein said outlet comprises a spigot connected to and movable with said riser when said riser is moved to operate said valve.

9. The sanitary water hydrant of claim 8 further comprising an elongate opening on said housing, said spigot extending through and moving in said opening when said riser is moved.

10. The sanitary water hydrant of claim 1 including a riser operating element disposed proximate said upper end of said housing for moving said riser in said directions.

11. The sanitary water hydrant of claim 1, further comprising a bypass valve operably coupled between said outlet and said riser to facilitate drainage of water through said riser into said water receiving chamber when said valve is closed.

12. A sanitary water hydrant, comprising:
a hydrant housing having an upper end and a lower end;
a water valve operably disposed proximate said lower end;
a water outlet;
a water riser disposed within said housing for passing water between said water outlet and said water valve, said riser being selectively engagable with and disengageable from said water valve;
said water riser being moveable within said housing in a first direction to open said water valve for passing water through said riser to said outlet, and moveable in a second direction for closing said water valve;
a water chamber disposed proximate said distal end of said housing, said chamber operably connected to receive water from said riser when said water valve is closed; and
a piston in said chamber and coupled to said riser for sliding movement with respect thereto, said piston discharging water from said chamber into said riser when said riser moves in said first direction.

13. The sanitary water hydrant of claim 12 wherein said outlet is operably connected to and moves with said riser.

14. The sanitary water hydrant of claim 12 wherein said hydrant is mounted in soil for year round outdoor use where temperatures drop below freezing and a frost line is created in the soil in which said hydrant is mounted, said chamber being located below said frost line.

15. The sanitary water hydrant of claim 14 wherein said upper end of said housing defines an opening and may be closed by a removable cap.

16. The sanitary water hydrant of claim 15 wherein said valve is accessible through said opening.

17. The sanitary water hydrant of claim 12 including an elongated slot in said housing, said outlet extending through said slot and moving in said slot when said riser moves in said directions.

18. A hydrant for potable water, comprising:
a housing;
a chamber housing coupled to a distal end of said housing such that said chamber housing may be buried a desired distance below a surface, said chamber housing defining first and second chambers;
a valve disposed within said first chamber of said chamber housing and in fluid communication with a water supply, said valve having a closed condition, wherein flow of water from the supply is prohibited by said valve, and an open condition, wherein water from the supply may flow through said valve;
a plunger disposed within said chamber housing and engageable with said valve to move said valve between an open condition and a closed condition;
a riser disposed within said housing and coupled at a first end to said plunger and at a second end to an outlet of the hydrant, said riser movable within said housing to engage and disengage said plunger with said valve, whereby water may flow from the water supply to the outlet when said riser is moved to engage said plunger with said valve and whereby flow of water from the supply is shut off when said riser is moved to disengage said plunger from said valve; and
a piston slidably disposed within said second chamber of said chamber housing and slidably supported on said riser, said piston having an aperture defined therethrough for receiving said plunger whereby movement of said riser to engage said plunger with said valve moves said piston in a direction toward said valve and movement of said riser to disengage said plunger from said valve moves said piston in a direction away from said valve.

19. The hydrant of claim 18 wherein said chamber housing is configured to receive a volume of water remaining in said riser when said riser is moved to disengage said plunger from said valve and to move said piston away from said valve.

20. The hydrant of claim 19 wherein the motion of said piston away from said valve draws the volume of water from said riser and into said chamber housing.

21. The hydrant of claim 18 wherein said piston is biased in a direction toward said valve to seat against a floor of said second chamber in said chamber housing when said riser moves to engage said plunger with said valve.

22. The hydrant of claim 21 wherein said piston expels water stored in said second chamber of said chamber housing through said riser and outlet as said piston moves in said chamber housing and before said plunger engages said valve.

23. The hydrant of claim 22 wherein said plunger continues to move in a direction to engage said valve after said piston has seated within said second chamber and the volume of water stored in said second chamber has been expelled therefrom.

24. A method of dispensing water from a hydrant having a riser disposed within a housing of the hydrant and a chamber housing buried a distance beneath a surface sufficient to locate the chamber housing below a frost line, the method comprising:

moving the riser to move a piston in the chamber housing to expel residual water stored therein through the riser and out of an outlet of the hydrant; and further moving the riser independently of the piston to engage a plunger located proximate a distal end of the riser with a valve coupled to a water supply to open the valve, whereby water from the water supply may flow through the valve and riser to exit the hydrant at the outlet.

25. The method of claim 24, further comprising:

moving the riser to disengage the plunger from the valve after a desired amount of water has been dispensed, whereby the valve closes to stop the flow of water from the supply.

26. The method of claim 25, further comprising:

further moving the riser to move the piston in the chamber housing to draw residual water from the riser into the chamber housing.

\* \* \* \* \*